(12) United States Patent
Huang et al.

(10) Patent No.: US 8,520,316 B2
(45) Date of Patent: Aug. 27, 2013

(54) WIDE-ANGLE ZOOM LENS SYSTEM

(75) Inventors: Hai-Jo Huang, New Taipei (TW); Fang-Ying Peng, New Taipei (TW); Sheng-An Wang, New Taipei (TW); An-Tze Lee, New Taipei (TW); Xiao-Na Liu, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,686

(22) Filed: Dec. 30, 2011

(65) Prior Publication Data
US 2013/0163093 A1    Jun. 27, 2013

(30) Foreign Application Priority Data
Dec. 23, 2011  (CN) .......................... 2011 1 0437294

(51) Int. Cl.
*G02B 15/14*  (2006.01)
(52) U.S. Cl.
USPC .......................................... 359/682; 359/689

(58) Field of Classification Search
USPC .................................. 359/682, 683, 676, 689
See application file for complete search history.

(56) References Cited

U.S. PATENT DOCUMENTS
2011/0176222 A1 *  7/2011  Ito .................................. 359/682

FOREIGN PATENT DOCUMENTS
CN           101859019 A       10/2010

* cited by examiner

*Primary Examiner* — Alicia M Harrington
(74) *Attorney, Agent, or Firm* — Altis Law Group, Inc.

(57) ABSTRACT

A wide-angle zoom lens system includes a first lens group with negative refraction power, a second lens group with positive refraction power, and a third lens group with positive refraction power. The first lens group, the second lens group, and the third lens group move along an optical axis of the zoom lens system in focusing. The wide-angle zoom lens system satisfies the formulas: $0.77 < |f2/f1| < 1.1$; and $0.7 < L_2/f_T < 1.08$; wherein f1 is the effective focal length of the first lens group, f2 is the effective focal length of the second lens group, $L_2$ is a distance of the second lens group moving from a wide-angle state to a telephoto state, and $f_T$ is the effective focal length of the wide-angle zoom lens system in the telephoto state.

11 Claims, 14 Drawing Sheets

WIDE-ANGLE ZOOM LENS SYSTEM

BACKGROUND

1. Technical Field

The present disclosure relates to wide-angle zoom lens systems and, particularly, to a wide-angle zoom lens system with a high image quality.

2. Description of Related Art

Wide-angle zoom lens systems with a large F number are widely used. However, there are certain challenges in designing such lenses. For example, the amount of light rays entering into the wide-angle zoom increases as the F number of the wide-angle zoom lens system increases, and, as a result, the field curvature, distortion and aberration occurring in the wide-angle zoom lens system will increase, degrading the image quality. Therefore, it is hard to design a wide-angle zoom lens system with a large F number while remaining the image quality at a high level.

Therefore, it is desirable to provide a wide-angle zoom lens system which can overcome the limitations described above.

DETAILED DESCRIPTION

Embodiments of the disclosure will now be described in detail with reference to the accompanying drawings.

Figure 1:
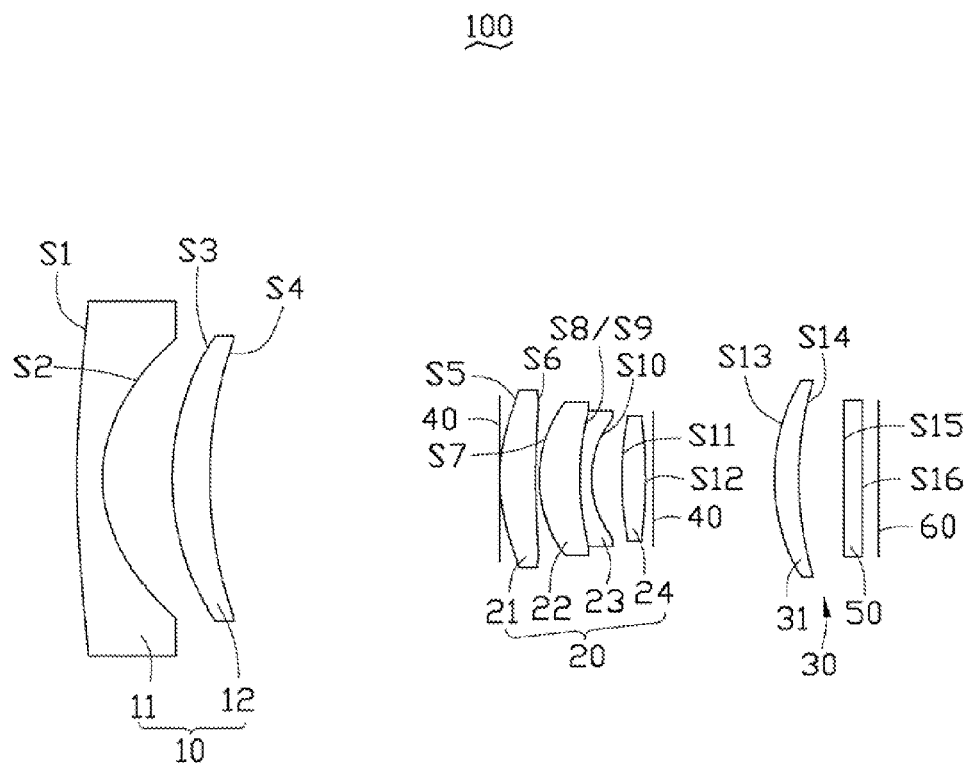
FIG. 1 is a schematic view of a wide-angle zoom lens system in accordance with a first exemplary embodiment.

Referring to FIG. 1, a wide-angle zoom lens system 100, according to a first exemplary embodiment, optically captures an image of an object at an object side and forms a corresponding image at an image side. The wide-angle zoom lens system 100 includes, in the order from the object side to the image side, a first lens group 10 with negative refraction power, a second lens group 20 with positive refraction power, and a third lens group 30 with positive refraction power. During the focusing process, the first lens group 10, the second lens group 20, and the third lens group 30 move along an optical axis of the wide-angle zoom lens system 100. The wide-angle zoom lens system 100 can be set among a wide-angle state and a telephoto state.

The wide-angle zoom lens system 100 further includes two apertures 40 and a filter glass 50. One of the two apertures 40 is positioned between the first lens group 10 and the second lens group 20, and the other aperture 40 is positioned between the second lens group 20 and the third lens group 30. The filter glass 50 is positioned at the image side of the third lens group 30. Light rays enter the wide-angle zoom 100, passing through the first lens group 10, the first aperture 40, the second lens group 20, the second aperture 40, the third lens group 30, and the filter glass 60, and finally forming optical images on an image surface 60. In this embodiment, the two apertures 40 are fixed together with the second lens group 20. During the focusing process from the wide-angle state to the telephoto state, the distance between the first lens group 10 and the second lens group 20 is decreased, and the distance between the second lens group 20 and the third lens group 30 is increased.

The first lens group 10 includes, in the order from the object side to the image side of the wide-angle zoom lens system 100, a first lens 11 with negative refraction power and a second lens 12 with negative refraction power. The first lens 11 is aspherical lens, and the second lens 12 is spherical lens. The first lens 11 is meniscus shaped and includes a convex first surface S1 facing the object side, and a concave second surface S2 facing the image side. The second lens 12 is meniscus shaped and includes a convex third surface S3 facing the object side, and a concave fourth surface S4 facing the image side.

The second lens group 20 includes, in the order from the object side to the image side of the wide-angle zoom lens system 100, a third lens 21 with positive refraction power, a fourth lens 22 with positive refraction power, a fifth lens 23 with negative refraction power, and a sixth lens 24 with positive refraction power. The third lens 21 and the sixth lens 24 are aspherical lenses. The fourth lens 22 and the fifth lens 23 are adhered to a compound spherical lens. The third lens 21 is meniscus shaped and includes a convex fifth surface S5 facing the object side, and a concave sixth surface S6 facing the image side. The fourth lens 22 is meniscus shaped and includes a convex seventh surface S7 facing the object side, and a concave eighth surface S8 facing the image side. The fifth lens 23 is meniscus shaped and includes a convex ninth surface S9 facing the object side, and a concave tenth surface S10 facing the image side. The sixth lens 24 is biconvex shaped and includes a convex eleventh surface S11 facing the object surface, and a convex twelfth surface S12 facing the image surface. In this embodiment, the third lens 21 and the sixth lens 24 are made of plastic material.

The third lens group 30 includes a seventh lens 31 with positive refraction power. The seventh lens 31 is aspherical lens. The seventh lens 31 is meniscus shaped and includes a convex thirteenth surface S13 facing the object side, and a fourteenth surface S14 facing the image side.

The filter glass 50 is flat plate shaped, and filters infrared light rays. The filter glass 50 includes a fifteenth surface S15 facing the object side and a sixteenth surface S16 facing the image side.

The wide-angle zoom lens system 100 satisfies the formulas:

$$0.77 < |f2/f1| < 1.1; \text{and} \quad (1)$$

$$0.7 < L_2/f_T < 1.08; \quad (2)$$

wherein f1 is the effective focal length of the first lens group 10, f2 is the effective focal length of the second lens group 20, $L_2$ is a distance of the second lens group 20 moving from the wide-angle state to the telephoto state, and $f_T$ is the effective focal length of the wide-angle zoom lens system 100 in the telephoto state. Formulas (1) and (2) are for correcting the aberrations of the wide-angle zoom lens system 100 with a large F number. If f2 is too short, the spherical aberration and the chromatic aberration of the wide-angle zoom lens system 100 will be very serious, and it is difficult to correct the aberrations using fourth lenses of second lens group 20; if f1 is too short, the distortion of the wide-angle zoom lens system 100 in the wide-angle state will be very serious. If f2 and f1 are too long, the total length of the wide-angle zoom lens system 100 will be increased, the thickness and cost of the wide-angle zoom lens system 100 also will be increased. If the moving distance of the second lens group 200 is too long, the thickness of the wide-angle zoom lens system 100 will be increased; if the moving distance is too short, f2 will be decreased and the spherical aberration and the chromatic aberration of the wide-angle zoom lens system 100 will be increased.

The wide-angle zoom lens system 100 further satisfies the formula:

$$1.2 < f3/f2 < 2.85; \qquad (3)$$

wherein f3 is the effective focal length of the third lens group 30. Formula (3) is for ensuring the success rate during focusing of the wide-angle zoom lens system 100. If f3 is too long, the wide-angle zoom lens system 100 will need a longer time to focus; if f3 is too short, the focus accuracy of the wide-angle zoom lens system 100 will be decreased.

The wide-angle zoom lens system 100 further satisfies the formula:

$$1.02 < N2/N1 < 1.15; \qquad (4)$$

Wherein N1 is the refractive index for the Helium d-line (587.56 nm) of the first lens 11 and N2 is the refractive index for the Helium d-line (587.56 nm) of the second lens 12. Formula (4) is for decreasing the field curvature of the wide-angle zoom lens system 100, and ensuring resolution of the edge and center of images during focusing.

The wide-angle zoom lens system 100 further satisfies the formulas:

$$2 < V1/V2 < 2.7; \text{ and} \qquad (5)$$

$$1.5 < V4/V5 < 3.8; \qquad (6)$$

Wherein V1 is the Abbe number of the first lens 11, V2 is the Abbe number of the second lens 12, V4 is the Abbe number of the fourth lens 22, and V5 is the Abbe number of the fifth lens 23. Formulas (5) and (6) are for correcting the lateral chromatic aberration in the wide-angle state and the axial chromatic aberration in the telephoto state.

The wide-angle zoom lens system 100 further satisfies the formula:

$$0.7 < T2/IH < 1.1; \qquad (7)$$

wherein T2 is the thickness of the second lens group 20 (the distance between the fifth surface S5 to the twelfth surface S12 along the optical axis of the wide-angle zoom lens system 100), IH is the diagonal distance of the image surface 60. Formula (7) is for decreasing the total length of the wide-angle zoom lens system 100.

The above aspherical surfaces are shaped according to the formula:

$$x = \frac{ch^2}{1 + \sqrt{1-(k+1)c^2h^2}} + \sum A_i h^i$$

wherein h is a height from the optical axis of the wide-angle zoom lens system 100 to a point of the aspherical surface, c is a vertex curvature, k is a conic constant, and Ai are i-th order correction coefficients of the aspherical surfaces.

The following symbols are used:

R: radius of curvature,

D: distance between surfaces on the optical axis,

Nd: refractive index for the Helium d-line (587.56 nm) of lens,

Vd: Abbe number,

F: effective focal length of the wide-angle zoom lens system 100, $F_{No}$: F number of the wide-angle zoom lens system 100, FOV: filed angle of the wide-angle zoom lens system 100, D4: distance between the fourth surface S4 to the adjacent aperture 40, D13: distance between the adjacent aperture 40 to the thirteenth surface S13, and D15: distance between the fourteenth surface S14 to the fifteenth surface S15.

The wide-angle zoom lens system 100 of the first exemplary embodiment satisfies the parameters of Tables 1-3.

TABLE 1

| surface | type | R(mm) | D(mm) | Nd | Vd | Conic |
|---|---|---|---|---|---|---|
| S1 | aspherical | 33.23615 | 1.1 | 1.85 | 40.1 | −155.4779 |
| S2 | aspherical | 5.858257 | 2.996 | — | — | −3.66469 |
| S3 | spherical | 11.054 | 1.61 | 1.92 | 18.9 | — |
| S4 | spherical | 17.765 | D4 | — | — | — |
| 40 | flat | infinity | 0 | — | — | — |
| S5 | aspherical | 7.879887 | 1.533 | 1.85 | 40.1 | −1.165794 |
| S6 | aspherical | 33.57481 | 0.15 | — | — | −62.16694 |
| S7 | spherical | 5.428 | 1.747 | 1.5 | 81.6 | — |
| S8/S9 | spherical | 11.759 | 0.5 | 1.85 | 23.8 | — |
| S10 | spherical | 4.097 | 1.291 | — | — | — |
| S11 | aspherical | 13.49798 | 1.016 | 1.55 | 71.7 | 11.76189 |
| S12 | aspherical | −21.00109 | 0.35 | — | — | 7.540376 |
| 40 | flat | infinity | D13 | — | — | — |
| S13 | aspherical | 8.331137 | 1.046 | 1.59 | 67 | 0 |
| S14 | spherical | 14.54401 | D15 | — | — | 0 |
| S15 | flat | infinity | 0.8 | 1.52 | 64.2 | — |
| S16 | flat | infinity | 0.7 | — | — | — |
| 60 | flat | infinity | — | — | — | — |

TABLE 2

| state | F | $F_{No}$ | FOV | D4 | D13 | D15 |
|---|---|---|---|---|---|---|
| wide-angle state | 4.43 | 1.85 | 82.7 | 21.586 | 5.178 | 1.925 |
| middle state | 11.85 | 3.4 | 37.3 | 4.2 | 12.422 | 1.918 |
| telephoto state | 19.38 | 4.9 | 22.7 | 0.3 | 20.137 | 1.384 |

TABLE 3

| aspherical coefficient | S1 | S2 | S5 | S6 | S11 | S12 | S13 |
|---|---|---|---|---|---|---|---|
| A4 | 3.4259447e−005 | 0.0013388716 | −3.7050473e−005 | −5.4781716e−005 | −0.0005581762 | 9.7424366e−005 | −0.00031134224 |
| A6 | 8.1020403e−007 | −2.6978714e−005 | −2.9912444e−006 | −3.3588524e−006 | −2.0165384e−005 | −1.8559437e−005 | 8.0553982e−005 |
| A8 | −6.2352271e−008 | 6.6781619e−007 | −3.895784e−007 | −1.1463657e−006 | 1.6104361e−005 | 1.7242832e−005 | −9.8779272e−006 |
| A10 | 1.5589202e−009 | −1.451814e−008 | −5.5037686e−008 | −4.6574324e−008 | −3.4456356e−006 | −3.1078458e−006 | 5.9552217e−007 |
| A12 | −1.7699116e−011 | 2.2366997e−010 | −2.5910532e−009 | −9.5078298e−010 | 0 | 0 | −6.097194e−009 |
| A14 | 7.4736094e−014 | −3.1811676e−013 | 1.89106e−010 | −2.9803345e−010 | 0 | 0 | −8.1241883e−010 |
| A16 | −6.0668527e−017 | −3.4140808e−014 | −1.7254343e−011 | 1.0850019e−011 | 0 | 0 | 2.4487334e−011 |

In the first embodiment, f2/f1=0.828; L2/fT=0.744; f3/f2=2.83; N2/N1=1.038; V1/V2=2.21; V4/V5=3.43; T2/IH=0.8.

Figure 2:
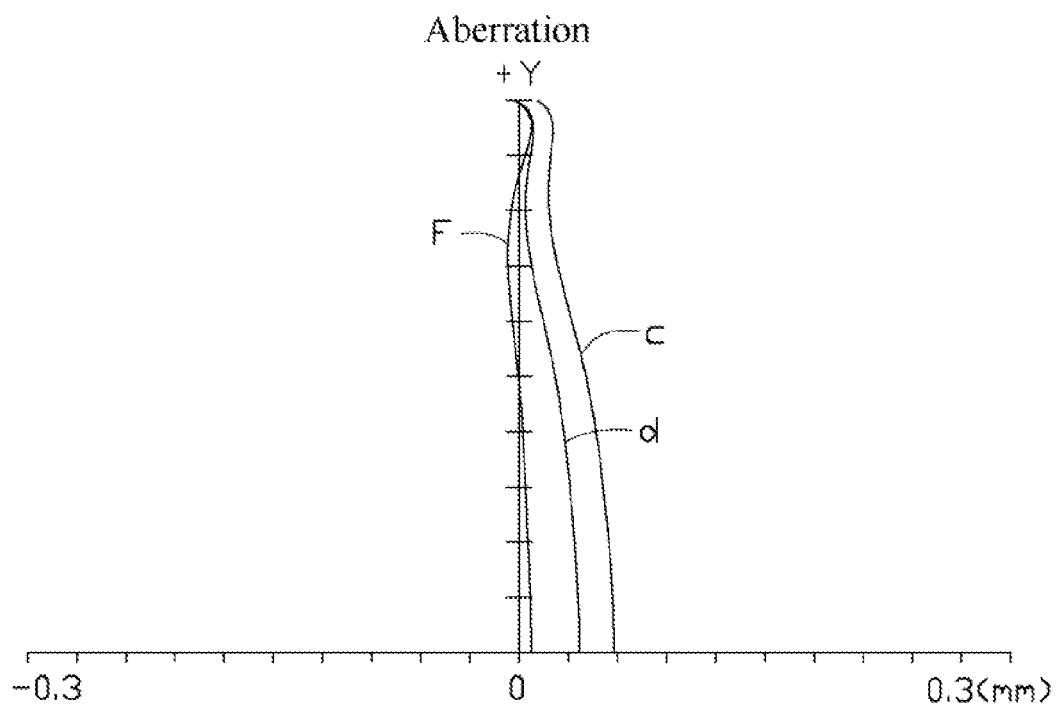
FIGS. 2-4 are graphs respectively showing aberration, field curvature, and distortion of the wide-angle zoom lens system of FIG. 1, when the wide-angle zoom lens system is in a wide-angle state.
Figure 3:
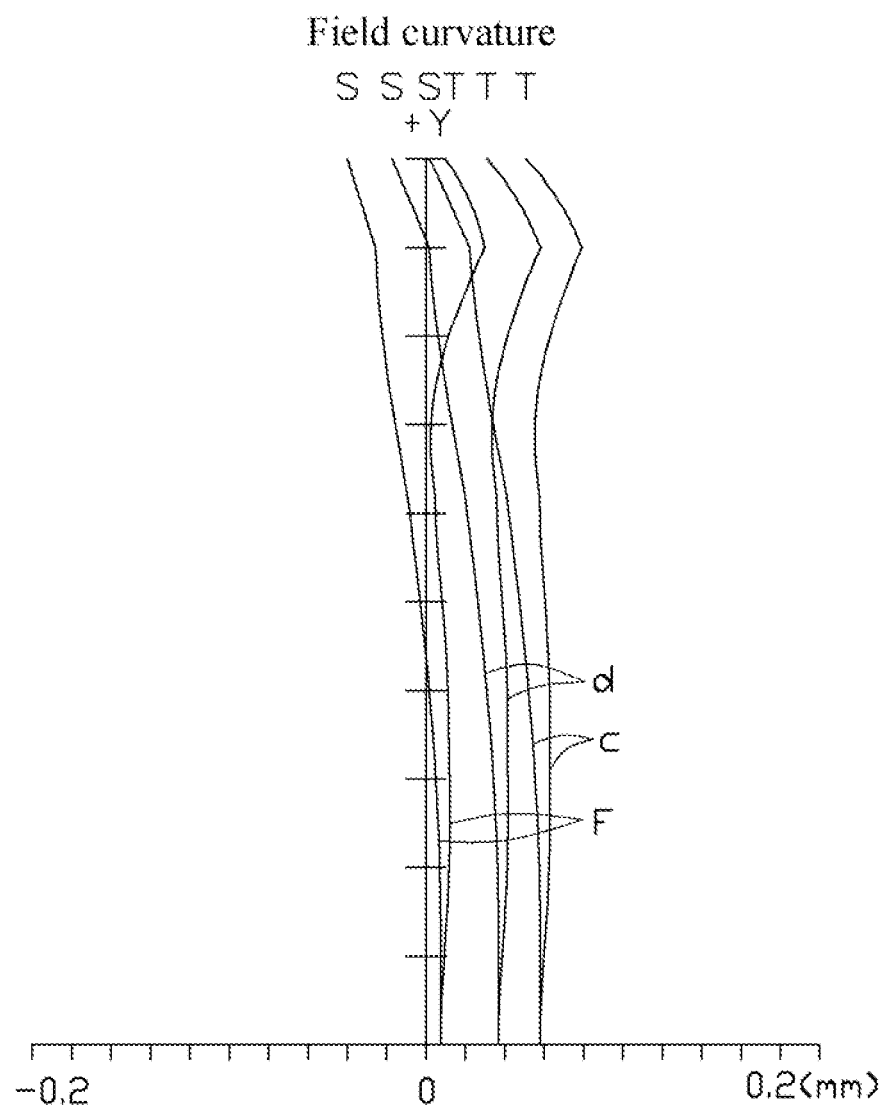
Figure 4:
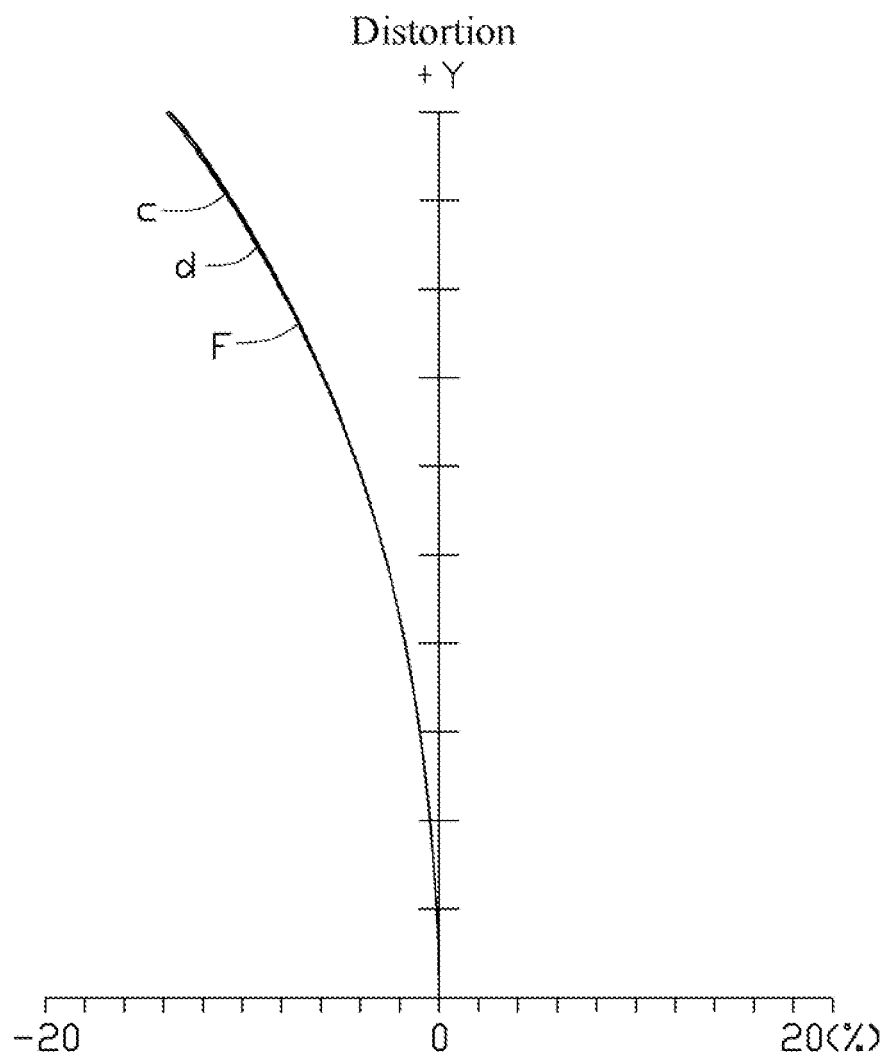

The aberration graph, the field curvature graph, and the distortion graph of the wide-angle zoom lens system 100 in the wide angle state are respectively shown in FIGS. 2-4. The curves presented in the FIGS. 2-4 are F light rays (wavelength: 486 nm), d light rays (wavelength: 588 nm), c light rays (wavelength: 655 nm). The aberration of visible light in FIG. 2 is within a range of −0.30 mm to 0.30 mm. The sagittal field curvature and tangential field curvature shown in FIG. 3 are kept within a range of −0.20 mm to 0.20 mm. The distortion in FIG. 4 falls within a range of −20% to 0%. Obviously, the aberration, field curvature, and distortion are well controlled in the wide-angle zoom lens system 100.

Figure 5:
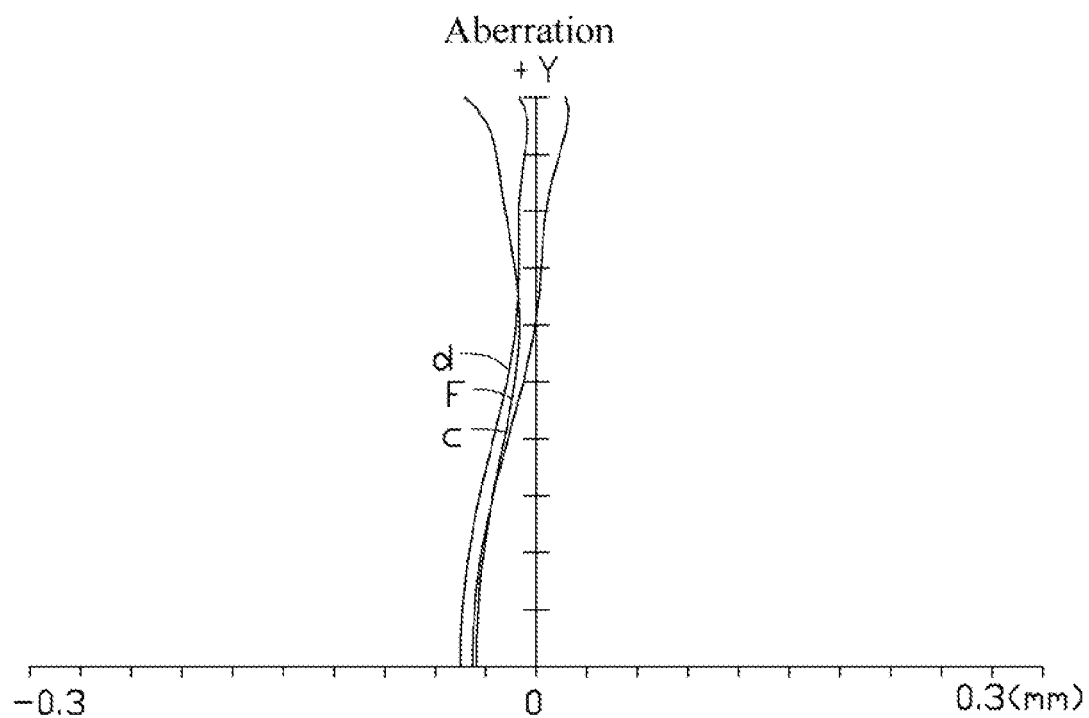
FIGS. 5-7 are graphs respectively showing aberration, field curvature, and distortion of the wide-angle zoom lens system of FIG. 1, when the wide-angle zoom lens system is in a telephoto state.
Figure 6:
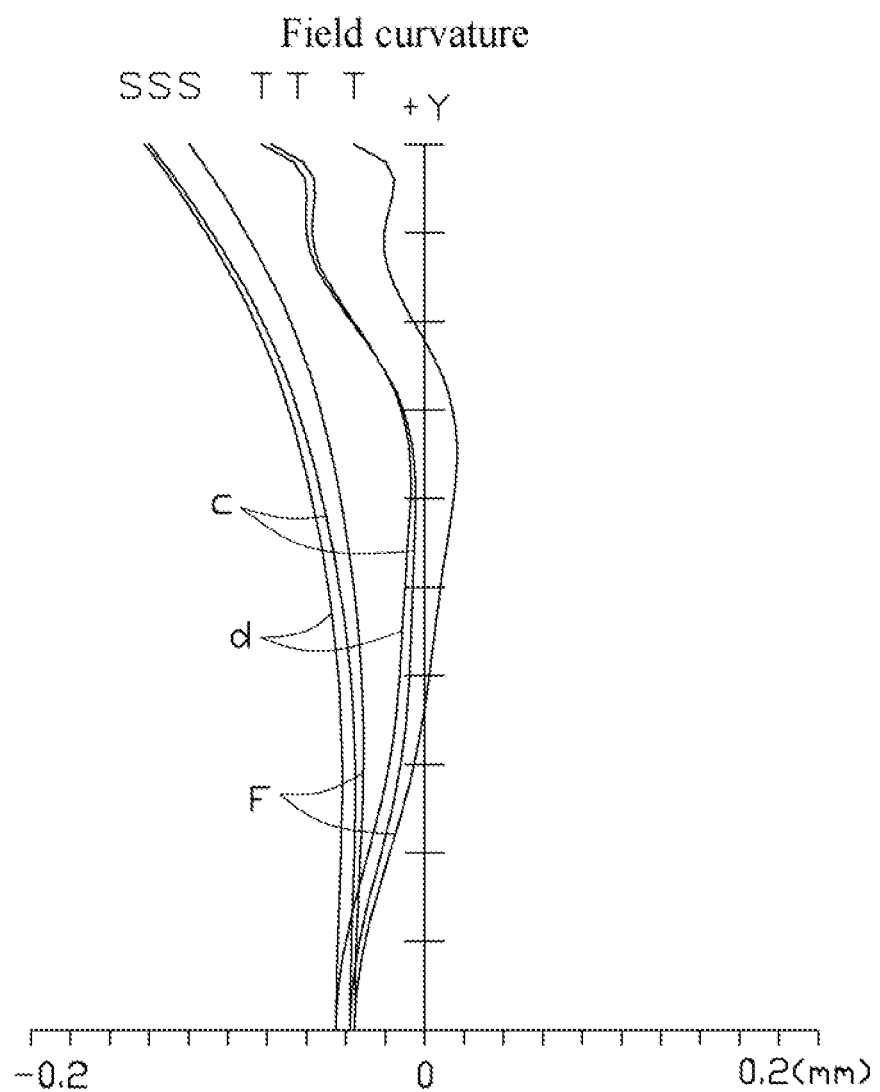
Figure 7:
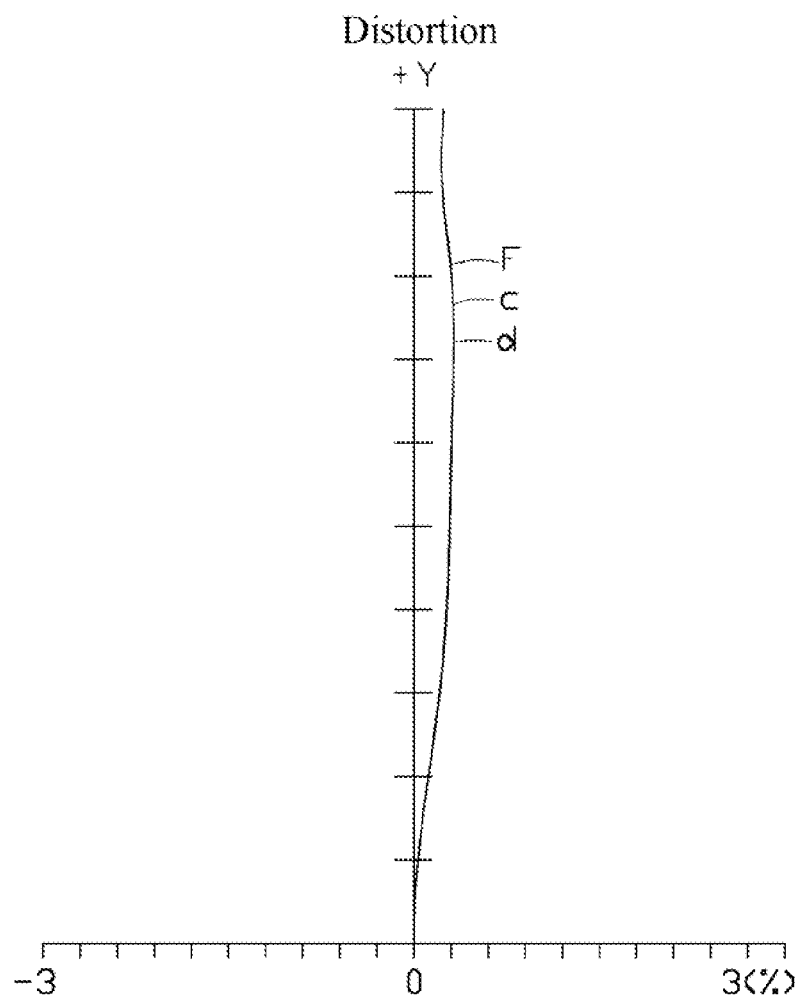

The aberration graph, the field curvature graph, and the distortion graph of the wide-angle zoom lens system 100 in the telephoto state are respectively shown in FIGS. 5-7. The curves presented in the FIGS. 5-7 are F light rays (wavelength: 486 nm), d light rays (wavelength: 588 nm), c light rays (wavelength: 655 nm). The aberration of visible light in FIG. 5 is within a range of −0.30 mm to 0.30 mm. The sagittal field curvature and tangential field curvature shown in FIG. 6 are kept within a range of −0.20 mm to 0.20 mm. The distortion in FIG. 7 falls within a range of 0% to 3%. Obviously, the aberration, field curvature, and distortion are well controlled in the wide-angle zoom lens system 100.

TABLE 4

| surface | type | R(mm) | D(mm) | Nd | Vd | Conic |
|---|---|---|---|---|---|---|
| S1 | spherical | −92.56602 | 1.1 | 1.77 | 49.2 | 0 |
| S2 | aspherical | 6.489363 | 2.803 | — | — | −0.4054246 |
| S3 | spherical | 13.35 | 1.947 | 2 | 19.3 | — |
| S4 | spherical | 28.134 | D4 | — | — | — |
| 40 | flat | infinity | 0 | — | — | — |
| S5 | aspherical | 8.718527 | 2.001 | 1.53 | 55.8 | −0.4527443 |
| S6 | spherical | 151.2296 | 0.15 | — | — | 0 |
| S7 | spherical | 7.501 | 2.092 | 1.9 | 31.3 | — |
| S8/S9 | spherical | 16.719 | 0.5 | 1.95 | 18 | — |
| S10 | spherical | 5.727 | 1.801 | — | — | — |
| S11 | spherical | 22.9114 | 1.017 | 1.53 | 55.8 | 0 |
| S12 | aspherical | −289.0291 | 0.35 | — | — | 0 |
| 40 | flat | infinity | D13 | — | — | — |
| S13 | spherical | 13.74286 | 1.476 | 1.61 | 26.6 | 0 |
| S14 | aspherical | −47.32361 | D15 | — | — | 0 |
| S15 | flat | infinity | 0.8 | 1.52 | 64.2 | — |
| S16 | flat | infinity | 0.7 | — | — | — |
| 60 | flat | infinity | — | — | — | — |

TABLE 5

| state | F | $F_{No}$ | FOV | D4 | D13 | D15 |
|---|---|---|---|---|---|---|
| wide-angle state | 4.43 | 1.85 | 82.7 | 28.62 | 6.895 | 2.748 |
| middle state | 11.85 | 3.4 | 36.2 | 9.322 | 17.726 | 2.415 |
| telephoto state | 19.37 | 4.9 | 22.2 | 5.005 | 28.042 | 1.723 |

TABLE 6

| aspherical coefficient | S2 | S5 | S12 | S14 |
|---|---|---|---|---|
| A4 | −0.00018812206 | 3.3838022e−005 | 0.00044422499 | 0.00040448117 |
| A6 | −6.4928506e−006 | −1.4398007e−005 | 3.6452778e−006 | −5.210592e−005 |
| A8 | 3.0675209e−007 | 2.9750016e−006 | 9.8725587e−007 | 4.5693916e−006 |
| A10 | −8.615231e−009 | −3.3123912e−007 | −3.1513374e−008 | −1.0144265e−007 |
| A12 | 6.7778718e−012 | 2.0728688e−008 | 0 | −1.173982e−008 |
| A14 | 2.8869676e−012 | −6.7791745e−010 | 0 | 8.1030444e−010 |
| A16 | −3.3347841e−014 | 9.0152281e−012 | 0 | −1.4821344e−011 |

Figure 8:
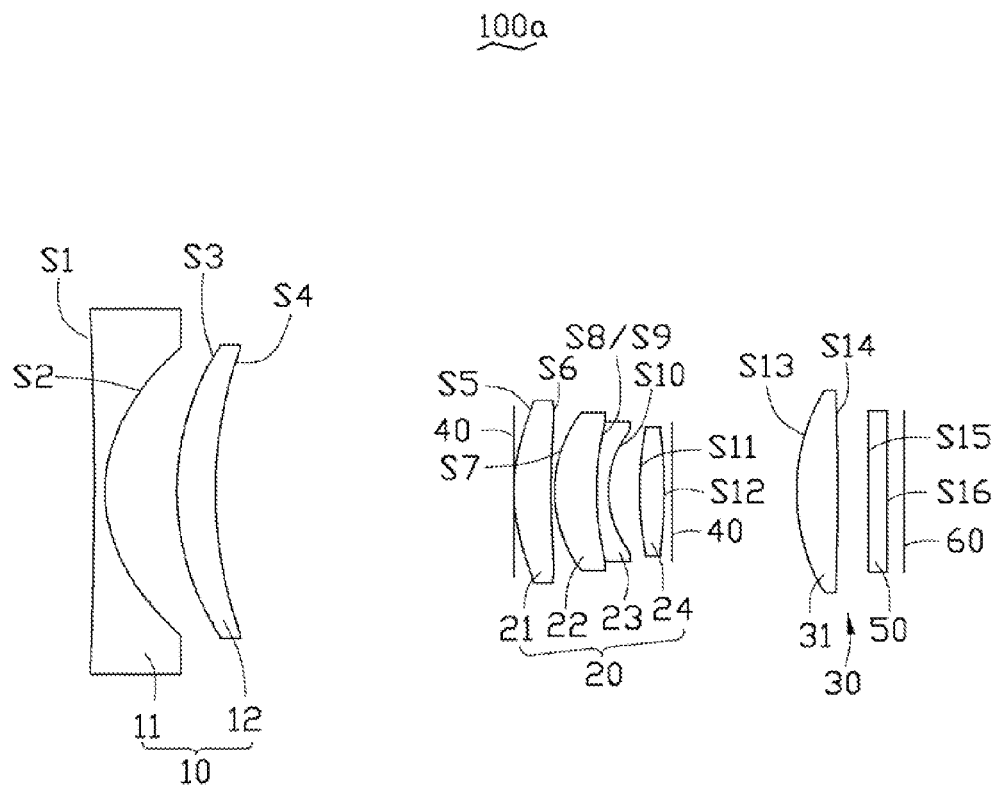
FIG. 8 is a schematic view of a wide-angle zoom lens system in accordance with a second exemplary embodiment.

Referring to FIG. 8, a wide-angle zoom lens system 100a according to a second exemplary embodiment is shown. The wide-angle zoom lens system 100a is essentially similar to the wide-angle zoom lens system 100, except that: the first surface S1, the sixth surface S6, the eleventh surface S11, and the thirteenth surface S13 are spherical surface, the fourteenth surface S14 are aspherical surfaces. The wide-angle zoom lens system 100a of the second exemplary embodiment satisfies the parameters of Tables 4-6.

In the second exemplary embodiment, f2/f1=1.05; L2/fT=1.039; f3/f2=1.254; N2/N1=1.13; V1/V2=2.55; V4/V5=1.739; T2/IH=0.97.

Figure 9:
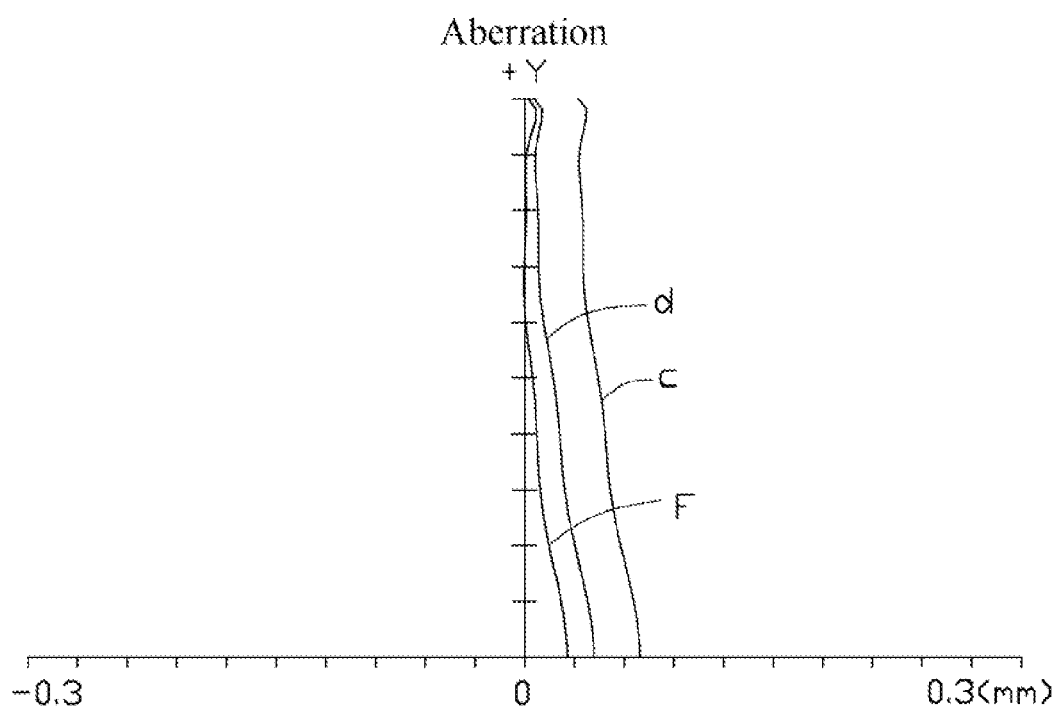
FIGS. 9-11 are graphs respectively showing aberration, field curvature, and distortion of the wide-angle zoom lens system of FIG. 8, when the wide-angle zoom lens system is in a wide-angle state.
Figure 10:
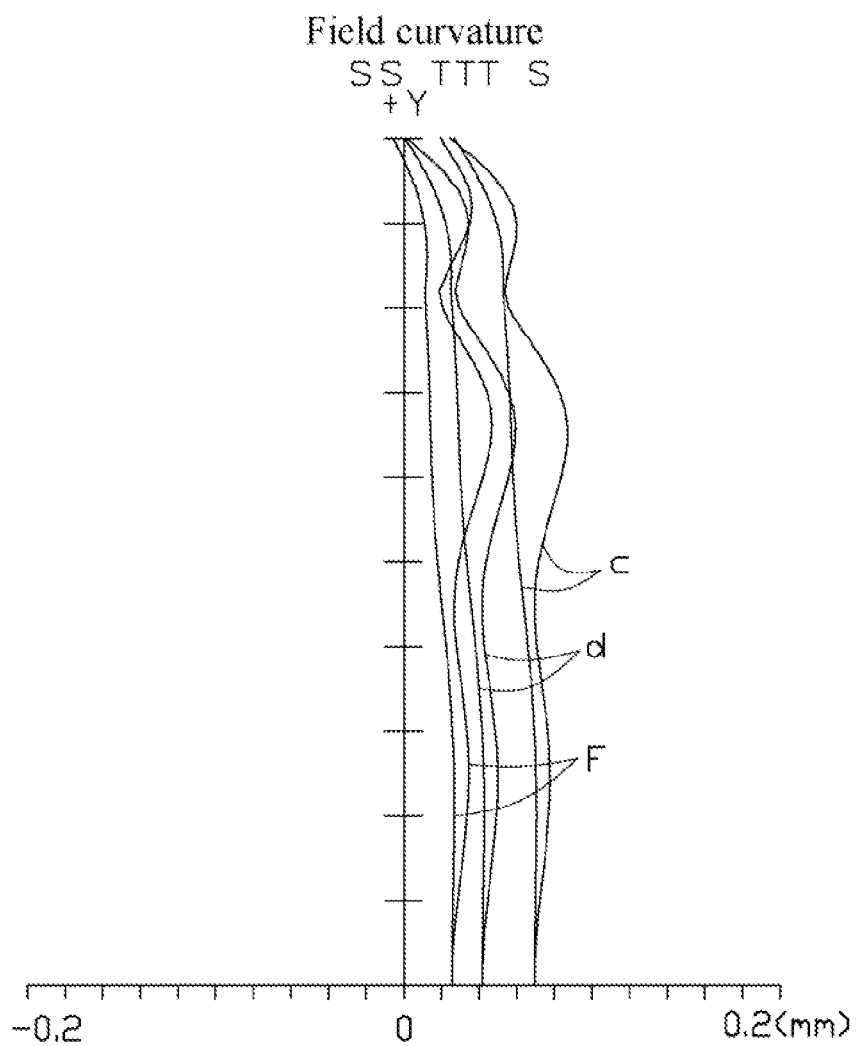
Figure 11:
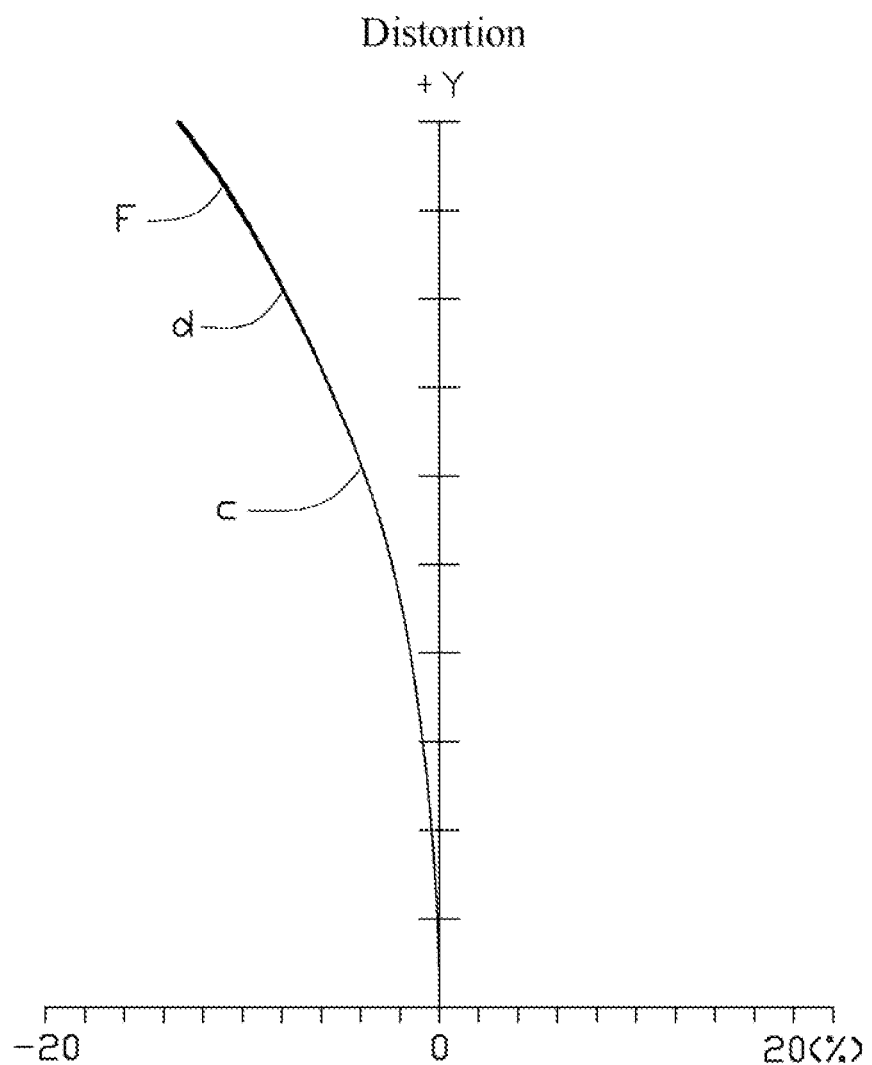

The aberration graph, the field curvature graph, and the distortion graph of the wide-angle zoom lens system 100a in the wide angle state are respectively shown in FIGS. 9-11. The curves presented in the FIGS. 9-11 are F light rays (wavelength: 486 nm), d light rays (wavelength: 588 nm), c light rays (wavelength: 655 nm). The aberration of visible light in FIG. 9 is within a range of 0 mm to 0.30 mm. The sagittal field curvature and tangential field curvature shown in FIG. 10 are kept within a range of 0 mm to 0.20 mm. The distortion in FIG. 11 falls within a range of −20% to 0%. Obviously, the aberration, field curvature, and distortion are well controlled in the wide-angle zoom lens system 100a.

Figure 12:
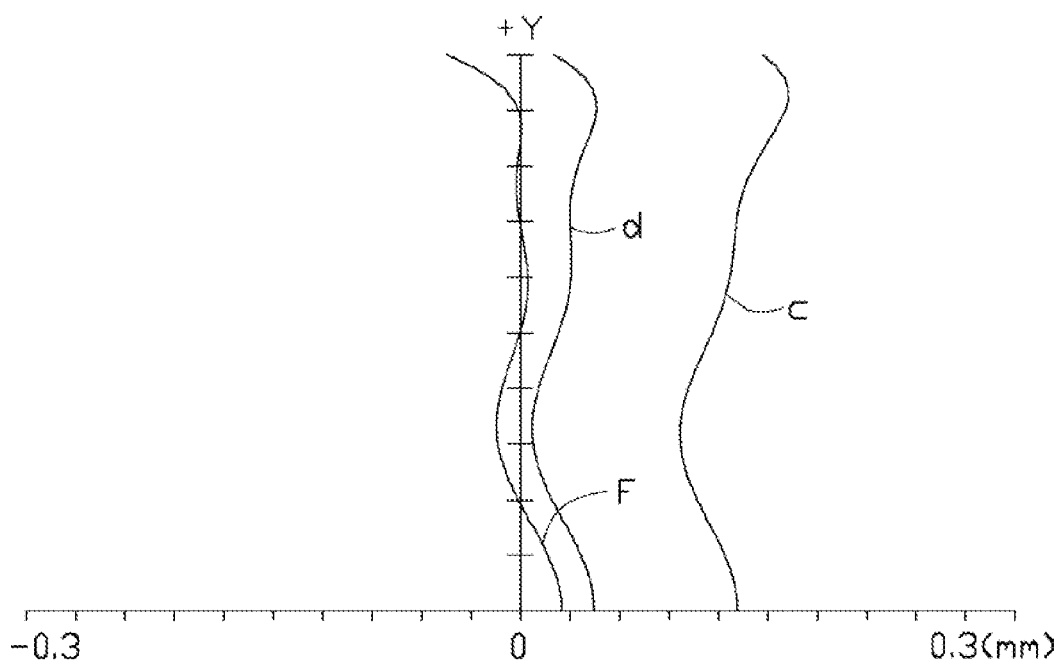
FIGS. 12-14 are graphs respectively showing aberration, field curvature, and distortion of the wide-angle zoom lens system of FIG. 8, when the wide-angle zoom lens system is in a telephoto state.
Figure 13:
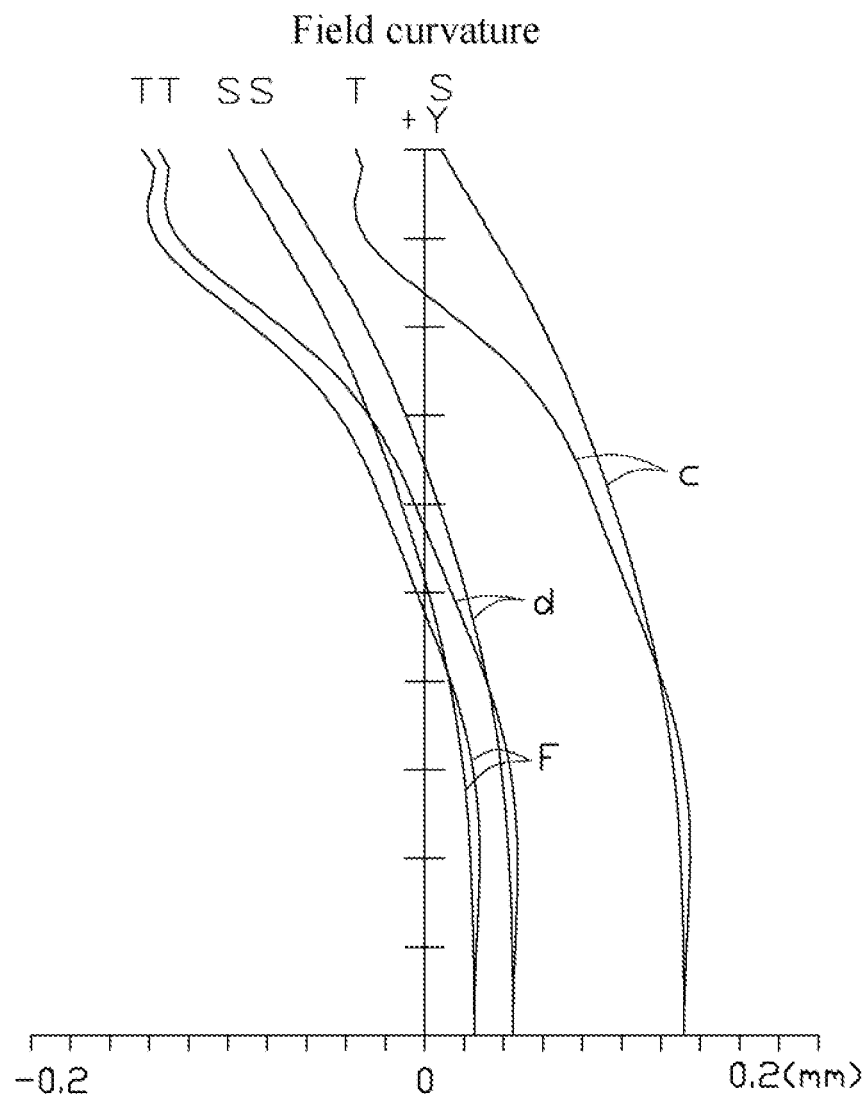
Figure 14:
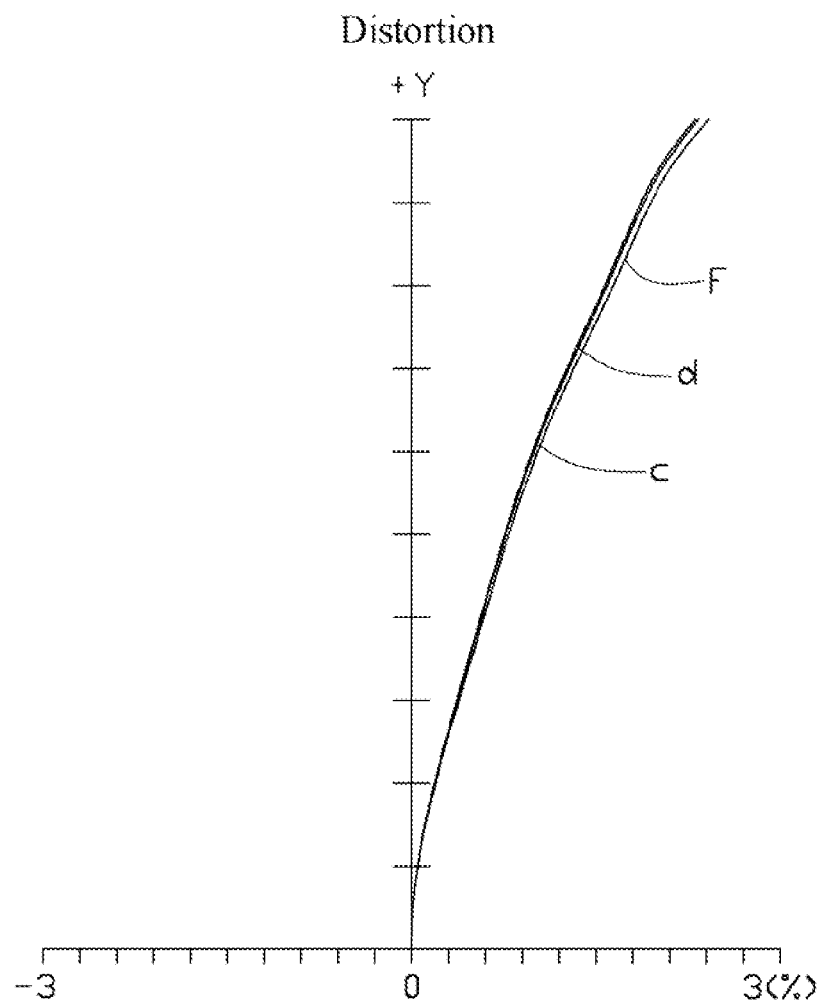

The aberration graph, the field curvature graph, and the distortion graph of the wide-angle zoom lens system 100a in the telephoto state are respectively shown in FIGS. 12-14. The curves presented in the FIGS. 12-14 are F light rays (wavelength: 486 nm), d light rays (wavelength: 588 nm), c light rays (wavelength: 655 nm). The aberration of visible light in FIG. 12 is within a range of −0.30 mm to 0.30 mm. The sagittal field curvature and tangential field curvature shown in FIG. 13 are kept within a range of −0.20 mm to 0.20 mm. The distortion in FIG. 14 falls within a range of 0% to 3%. Obviously, the aberration, field curvature, and distortion are well controlled in the wide-angle zoom lens system 100a.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A wide-angle zoom lens system for imaging an object at an object side on an image surface at an image side, in the order from the object side to the image side, the wide-angle zoom lens system comprising:
   a first lens group with negative refraction power;
   a second lens group with positive refraction power; and
   a third lens group with positive refraction power;
   wherein during the focusing process, the first lens group, the second lens group, and the third lens group move along an optical axis of the wide-angle zoom lens system; the wide-angle zoom lens system satisfies the formulas:

$0.77 < |f2/f1| < 1.1$;

$0.7 < L_2/f_T < 1.08$; and $0.7 < T2/IH < 1.1$;

wherein f1 is an effective focal length of the first lens group, f2 is an effective focal length of the second lens group, L2 is a distance of the second lens group moving from a wide-angle state to a telephoto state, fT is an effective focal length of the wide-angle zoom lens system in the telephoto state, T2 is a thickness of the second lens group along the optical axis of the wide-angle zoom lens system, and IH is a diagonal distance of the image surface.

2. The wide-angle zoom lens system as claimed in claim 1, wherein the first lens group comprises, in the order from the object side to the image side of the wide-angle zoom lens system, a first lens with negative refraction power and a second lens with negative refraction power; the second lens group comprises, in the order from the object side to the image side of the wide-angle zoom lens system, a third lens with positive refraction power, a fourth lens with positive refraction power, a fifth lens with negative refraction power, and a sixth lens with positive refraction power; the third lens group comprises a seventh lens with positive refraction power.

3. The wide-angle zoom lens system as claimed in claim 2, wherein the first lens, the third lens, the sixth lens, and the seventh lens are aspherical lenses, the second lens is spherical lens, and the fourth lens and the fifth lens are combined to a compound spherical lens.

4. The wide-angle zoom lens system as claimed in claim 2, wherein the wide-angle zoom lens system further satisfies the formula:

$1.2 < f3/f2 < 2.85$;

wherein f3 is an effective focal length of the third lens group.

5. The wide-angle zoom lens system as claimed in claim 2, wherein the wide-angle zoom lens system further satisfies the formula:

$1.02 < N2/N1 < 1.15$;

Wherein N1 is the refractive index for the Helium d-line (587.56 nm) of the first lens and N2 is the refractive index for the Helium d-line (587.56 nm) of the second lens.

6. The wide-angle zoom lens system as claimed in claim 2, wherein the wide-angle zoom lens system further satisfies the formulas:

$2 < V1/V2 < 2.7$; and $1.5 < V4/V5 < 3.8$;

Wherein V1 is the Abbe number of the first lens, V2 is the Abbe number of the second lens, V4 is the Abbe number of the fourth lens, and V5 is the Abbe number of the fifth lens.

7. The wide-angle zoom lens system as claimed in claim 6, further comprising a first aperture and a second aperture, wherein the first apertures is positioned between the first lens group and the second lens group, and the second aperture is positioned between the second lens group and the third lens group.

8. The wide-angle zoom lens system as claimed in claim 7, wherein light rays enter the wide-angle zoom, passing through the first lens group, the first aperture, the second lens group, the second aperture, the third lens group, and the filter glass, finally forming optical images on the image surface.

9. The wide-angle zoom lens system as claimed in claim 2, wherein the first lens is meniscus shaped and comprises a convex first surface facing the object side, and a concave second surface facing the image side; the second lens is meniscus shaped and comprises a convex third surface facing the object side, and a concave fourth surface facing the image side.

10. The wide-angle zoom lens system as claimed in claim 2, wherein the third lens is meniscus shaped and comprises a convex fifth surface facing the object side, and a concave sixth surface facing the image side; the fourth lens is meniscus shaped and comprises a convex seventh surface facing the object side, and a concave eighth surface facing the image side; the fifth lens is meniscus shaped and comprises a convex ninth surface facing the object side, and a concave tenth surface facing the image side; the sixth lens is biconvex shaped and comprises a convex eleventh surface facing the object surface, and a convex twelfth surface facing the image surface.

11. The wide-angle zoom lens system as claimed in claim 2, wherein the seventh lens is meniscus shaped and comprises a convex thirteenth surface facing the object side, and a fourteenth surface facing the image side.

* * * * *